(12) United States Patent
Ahn

(10) Patent No.: US 12,145,491 B2
(45) Date of Patent: Nov. 19, 2024

(54) MOVING CONSOLE FOR VEHICLE

(71) Applicants: Hyundai Motor Company, Seoul (KR); Kia Corporation, Seoul (KR)

(72) Inventor: Gye Young Ahn, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 361 days.

(21) Appl. No.: 17/872,510

(22) Filed: Jul. 25, 2022

(65) Prior Publication Data
US 2023/0115952 A1 Apr. 13, 2023

(30) Foreign Application Priority Data

Oct. 8, 2021 (KR) .................. 10-2021-0133557

(51) Int. Cl.
*B60N 3/00* (2006.01)
*B60H 1/00* (2006.01)
*B60N 2/02* (2006.01)

(52) U.S. Cl.
CPC .......... *B60N 3/001* (2013.01); *B60H 1/00564* (2013.01); *B60N 2/02* (2013.01); *B60N 2002/0216* (2013.01)

(58) Field of Classification Search
CPC .. B60N 3/001; B60N 2/02; B60N 2002/0216; B60H 1/00564; B60H 2001/002; B60H 1/00285; B60H 1/246; B60H 1/00207; B60H 1/34; B60H 2001/00228; B60R 7/04; B60R 2011/0007; B60R 2011/0052; B60R 2011/0064; B60R 2011/0084; B60R 2011/0094
See application file for complete search history.

(56) References Cited

U.S. PATENT DOCUMENTS

| | | | | |
|---|---|---|---|---|
| 9,346,407 | B2 * | 5/2016 | Bisson | B60R 7/04 |
| 10,232,785 | B1 * | 3/2019 | Mullen | B60N 2/5628 |
| 11,007,916 | B2 * | 5/2021 | Schlierf | B60N 2/0292 |
| 2007/0069541 | A1 * | 3/2007 | Sturt | B60R 7/04 296/24.34 |
| 2020/0156553 | A1 * | 5/2020 | Kang | B60R 7/04 |
| 2021/0309123 | A1 * | 10/2021 | Kang | B60N 2/22 |
| 2022/0234508 | A1 | 7/2022 | Ahn et al. | |

FOREIGN PATENT DOCUMENTS

| | | | | |
|---|---|---|---|---|
| DE | 10305648 | A1 * | 8/2004 | B60R 11/02 |
| DE | 102019003117 | A1 * | 11/2020 | B60H 1/00528 |
| JP | 3923892 | B2 * | 6/2007 | |
| KR | 101987006 | B1 | 6/2019 | |
| KR | 20200063280 | A | 6/2020 | |
| KR | 20220108552 | A | 8/2022 | |

* cited by examiner

*Primary Examiner* — Lori Lyjak
(74) *Attorney, Agent, or Firm* — Slater Matsil, LLP

(57) ABSTRACT

An embodiment moving console for a vehicle includes a first console unit including an accommodation space configured to be opened forward or rearward and an air-conditioning duct disposed at an outer side of the accommodation space and configured to discharge air to an interior of the vehicle through the air-conditioning duct, and a second console unit installed to be slidable at a front or a back of the first console unit such that, depending on forward/rearward sliding, the second console unit is accommodated in the accommodation space of the first console unit or is deployed out of the first console unit.

20 Claims, 14 Drawing Sheets

MOVING CONSOLE FOR VEHICLE

CROSS-REFERENCE TO RELATED APPLICATIONS

This application claims the benefit of Korean Patent Application No. 10-2021-0133557, filed on Oct. 8, 2021, which application is hereby incorporated herein by reference.

TECHNICAL FIELD

The present disclosure relates to a technology regarding a console mounted in a vehicle.

BACKGROUND

Consoles are installed in vehicles while having spaces in which objects can be stored, and conventional consoles are fixedly installed in vehicles.

Future vehicles are required to have seats which are not fixedly installed with regard to vehicle bodies, but cannot only move forward/backward/leftward/rightward but also can swivel, thereby enabling more diversified seat variation.

Therefore, consoles need to be mounted movably, instead of being fixed with regard to vehicle bodies, so as to respond to changes in seat position or posture.

In addition, if a console is installed both to be able to move with regard to the vehicle body and to be able to discharge warm or cold air blown from a vehicle air-conditioning vehicle, excellent vehicle indoor temperature control and air-conditioning performances can be secured even in the case of a vehicle which has no B pillar, and in which an air-conditioning vent cannot be thus installed easily.

Meanwhile, the above-mentioned requirements for future vehicles may be satisfied by moving a single console having an internal air-conditioning duct forward/backward in the longitudinal direction of the vehicle. However, this poses a problem in that the single console can only move forward/backward in the longitudinal direction of the vehicle, making it difficult to provide functions for passengers in the second row among vehicle occupants.

There is another problem in that it is difficult to provide an additional function (for example, a table function) when front seats are swiveled by 180° so as to face rear seats.

The above descriptions regarding background technologies have been made only to help understanding of the background of the present disclosure, and are not to be deemed by those skilled in the art to correspond to already known prior art.

SUMMARY

The present disclosure relates to a technology regarding a console mounted in a vehicle. Particular embodiments relate to a moving console for a vehicle, the moving console including a first console unit which is installed to be movable in a predetermined range with respect to a vehicle body, thereby providing an advantage in securing seat variation of the vehicle, and which is configured to discharge warm air or cold air blown from a vehicle air-conditioning device while having mobility, thereby facilitating vehicle temperature control and air conditioning, and a second console unit which can be accommodated therein, wherein a table is provided in the second console unit such that additional convenience functions can be provided to vehicle passengers.

Embodiments of the present disclosure can solve problems in the prior art, and an embodiment of the present disclosure provides a moving console for a vehicle, the moving console including a first console unit which is installed to be movable in a predetermined range with respect to a vehicle body, thereby providing an advantage in securing seat variation of the vehicle, and which is configured to discharge warm air or cold air blown from a vehicle air-conditioning device while having mobility, thereby facilitating vehicle temperature control and air conditioning, and a second console unit which can be accommodated therein, wherein a table is provided in the second console unit such that additional convenience functions can be provided to vehicle passengers.

In accordance with an embodiment of the present disclosure, a moving console for a vehicle includes a first console unit which is provided with an accommodation space formed to be opened forward or rearward and an air-conditioning duct formed at an outer side of the accommodation space to discharge air to the interior of the vehicle through the air-conditioning duct, and a second console unit installed to be slidable at the front or the back of the first console unit such that, depending on forward/rearward sliding, the second console unit is accommodated in the accommodation space of the first console unit or is deployed out of the first console unit.

An accommodation box may be formed in the first console unit, an opening/closing unit may be formed at the upper side of the accommodation box to expose the accommodation box when the opening/closing unit is opened, and the air-conditioning duct may be disposed between the outer side of the accommodation box and the outer surface of the first console unit.

The air-conditioning duct may be provided at and fixed to the inner side of the first console unit and may have one end communicating with the inner space of the vehicle and the other end being supplied with air from the floor duct fixed to a floor of the vehicle.

The moving console for a vehicle according to embodiments of the present disclosure may further include a first rail and a second rail which are provided at the floor of the vehicle and extend forward/rearward while being spaced apart from each other, a first moving part which is provided at lower opposite sides of the first console unit and slides on the first rail and the second rail, and a second moving part which is provided at lower opposite sides of the second console unit and slides on the first rail and the second rail.

The moving console for a vehicle according to embodiments of the present disclosure may further include a first driving unit which is provided at the floor of the vehicle and provides a moving force in the forward/rearward direction for the first moving part, and a second driving unit which is provided at the floor of the vehicle, is disposed in the direction opposite to the first driving unit, and provides a moving force in the forward/rearward direction for the second moving part.

The first driving unit and the second driving unit of the moving console for a vehicle according to embodiments of the present disclosure may include a shaft having a screw thread formed therein and a motor configured to rotate the shaft, and a nut screw-coupled to the shaft to slide on the shaft may be provided at each of the first moving part and the second moving part.

The shaft of the first driving unit of the moving console for a vehicle according to embodiments of the present disclosure may extend along the first rail, and the shaft of the second driving unit may extend along the second rail at the side opposite to the shaft of the first driving unit.

The motor of the first driving unit of the moving console for a vehicle according to embodiments of the present disclosure may be provided at the front end of the shaft of the first driving unit, and the motor of the second driving unit may be provided at the rear end of the shaft of the second driving unit.

The first driving unit and the second driving unit of the moving console for a vehicle according to embodiments of the present disclosure may be provided at the lower part of the floor of the vehicle not to be exposed to the indoor space of the vehicle.

The table may be provided at the second console unit, and, when the second console unit slides rearward and the upper surface of the second console unit is opened, the table may deploy to the outside through the opened upper surface of the second console unit.

The table provided at the second console unit may be blocked by the first console unit and thus not be deployed when the second console unit is inserted into the accommodation space of the first console unit.

The first console unit and the second console unit may be provided in the space between the left seat and the right seat of the front seats of the vehicle, and the moving console may further include a control unit configured to slide the first console unit in the forward direction of the vehicle when the left seat or the right seat of the front seats is swiveled and to return the first console unit to the original state in the rearward direction of the vehicle when the left seat or the right seat has swiveled.

When the left seat or the right seat of the front seats is swiveled to face the rear seats, the control unit of the moving console for a vehicle according to embodiments of the present disclosure may slide the second console unit rearward so that the second console unit is adjacent to the rear seats.

A moving console for a vehicle according to embodiments of the present disclosure may include a first console unit which is installed to be movable in a predetermined range with respect to a vehicle body, thereby providing an advantage in securing seat variation of the vehicle, and which is configured to discharge warm air or cold air blown from a vehicle air-conditioning device while having mobility, thereby facilitating vehicle temperature control and air conditioning, and a second console unit which can be accommodated therein, wherein a table is provided in the second console unit such that additional convenience functions can be provided to vehicle passengers.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
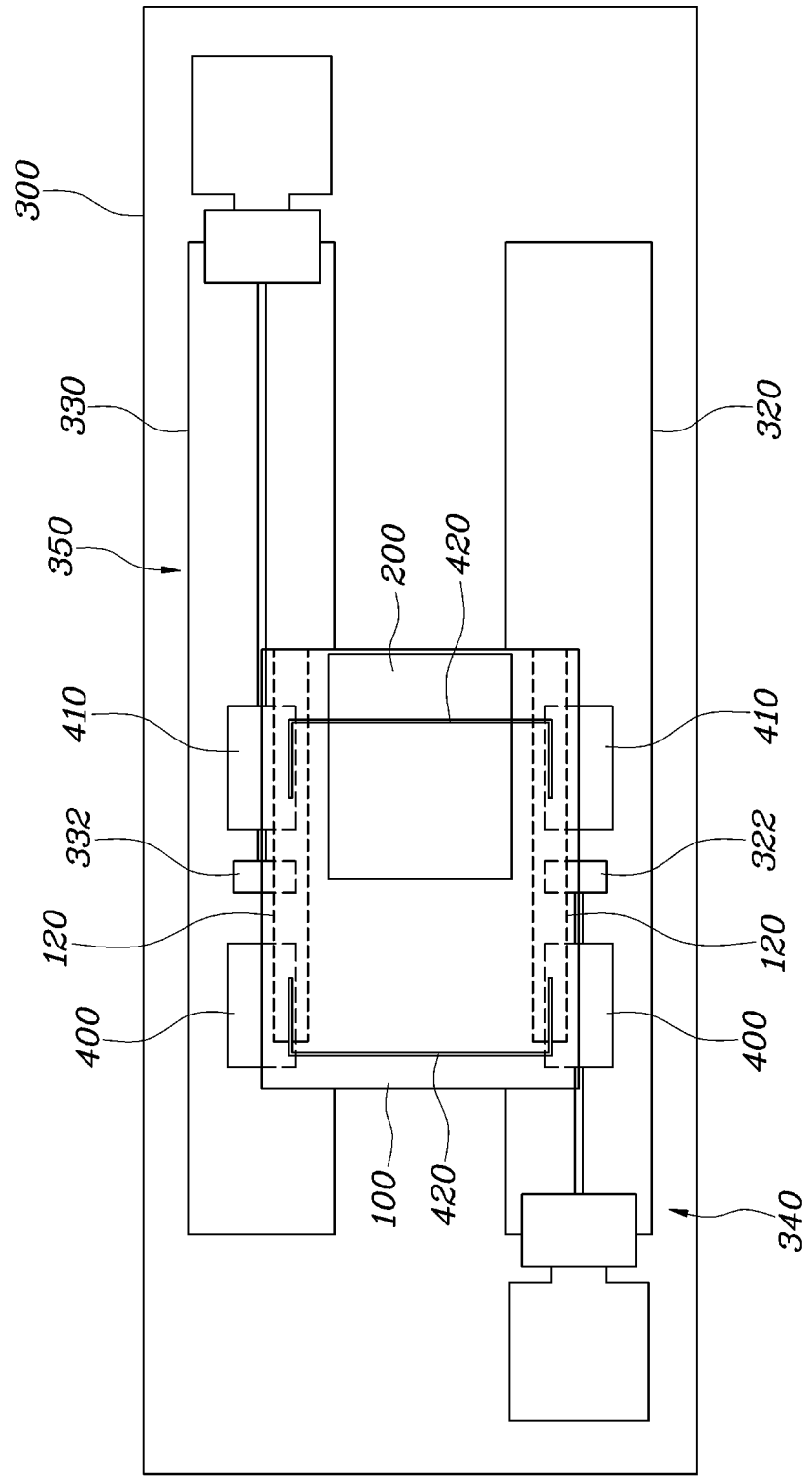
FIG. 1 is a projection view illustrating a moving console for a vehicle according to embodiments of the present disclosure when viewed from above.

Throughout the specification, when it is described that one part "includes" one component, it means that other components are not excluded and other components may be further included unless otherwise stated.

In addition, terms such as first and/or second may be used when describing various components, but these terms are merely used to distinguish one component from other components. For example, a first component may be referred to as a second component, and similarly, a second component may be referred to as a first component without departing from the scope of right based on the concept of the present disclosure.

Hereinafter, a configuration and principles of multiple embodiments of the disclosure disclosed herein will be described in detail with reference to the accompanying drawings.

Referring to FIG. 1 to FIG. 7, a moving console of a vehicle according to embodiments of the present disclosure may include a first console unit 100 which is provided with an accommodation space no formed to be opened forward or rearward and an air-conditioning duct 120 formed at an outer side of the accommodation space no to discharge air to the interior of the vehicle through the air-conditioning duct 120, and a second console unit 200 which is accommodated in the accommodation space no or deploys to the outside of the first console unit 100 depending on the forward/rearward sliding by being installed to be slidable at the front side or the rear side of the first console unit 100.

That is, in embodiments of the present disclosure, the accommodation space no for accommodating the second console unit 200 is formed at the first console unit 100 so that the embodiments of present disclosure do not need an additional inner space of the vehicle for the second console unit 200 while having the separate second console unit 200 in addition to the first console unit 100. The second console unit 200 is stored in a state of being accommodated in the accommodation space no of the first console unit 100 when not in use, and deploys to the outside of the first console unit 100 when in use. The second console unit 200 which has deployed to the outside of the first console unit 100 is installed to be slidable in the forward and rearward direction of the vehicle, and thus the position of the second console unit 200 can be easily changed as needed by a user.

Accordingly, when the second console unit 200 additionally has an additional function for a user, the second console unit 200 can be moved in the forward and rearward direction to provide an additional convenience function not only for a passenger in a front seat but also for a passenger in a rear seat.

In addition, cold air or warm air supplied from an air-conditioning system can be discharged to the interior of the vehicle through the air-conditioning duct 120 provided at the outer side of the accommodation space no of the first console unit 100, and thus the performance of air-conditioning and temperature adjustment for a vehicle can be easily satisfied.

That is, embodiments of the present disclosure may be used to easily secure the performance of air-conditioning and temperature adjustment for a vehicle such as a futuristic vehicle in which a B-pillar is eliminated and which cannot supply cold air or warm air through the B-pillar.

Figure 2:
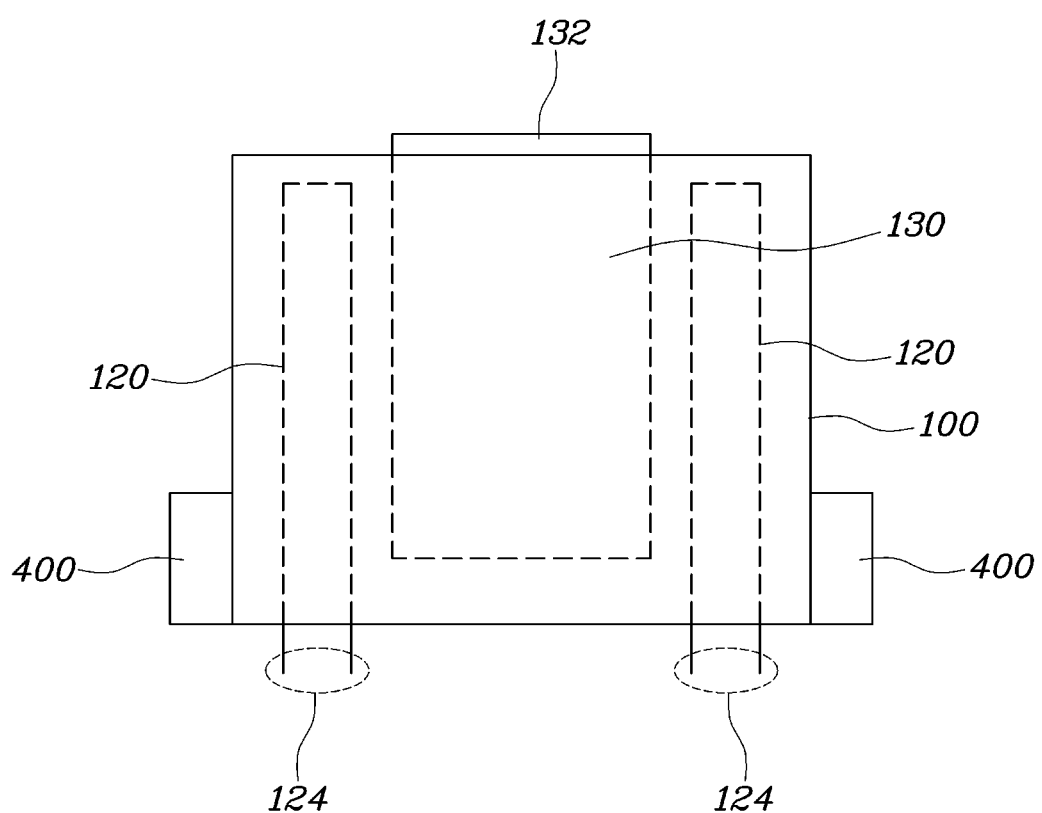
FIG. 2 is a projection view illustrating an accommodation box and an air-conditioning duct of a first console unit according to embodiments of the present disclosure.
Figure 3:
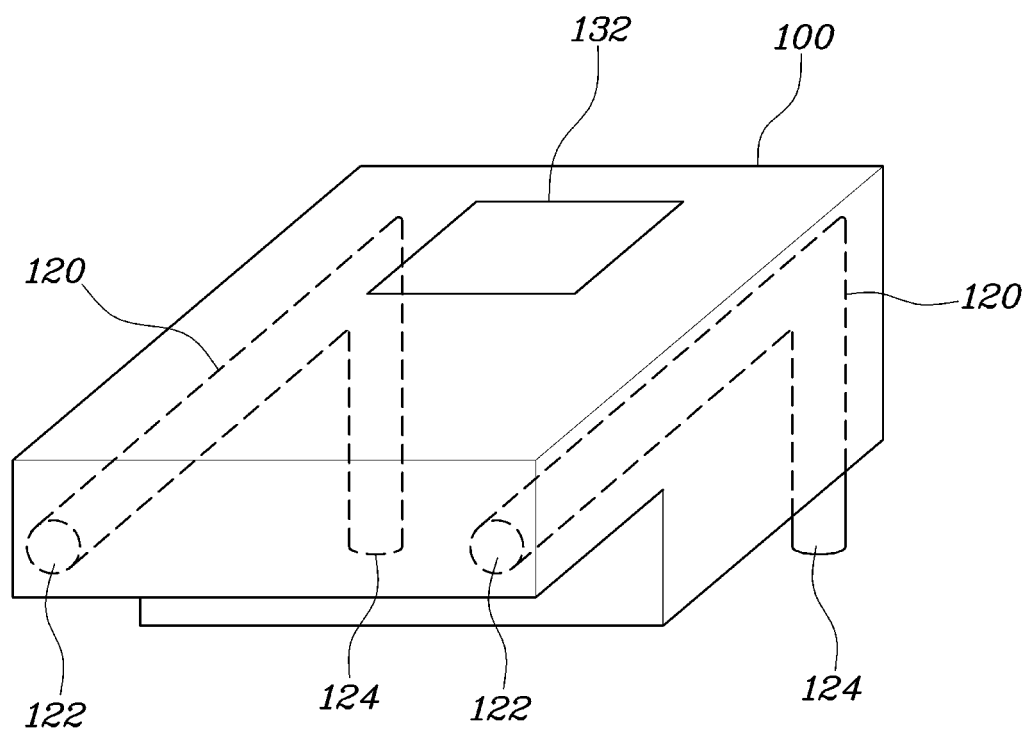
FIG. 3 is an orthographic projection view of a first console unit according to embodiments of the present disclosure.
Figure 4:
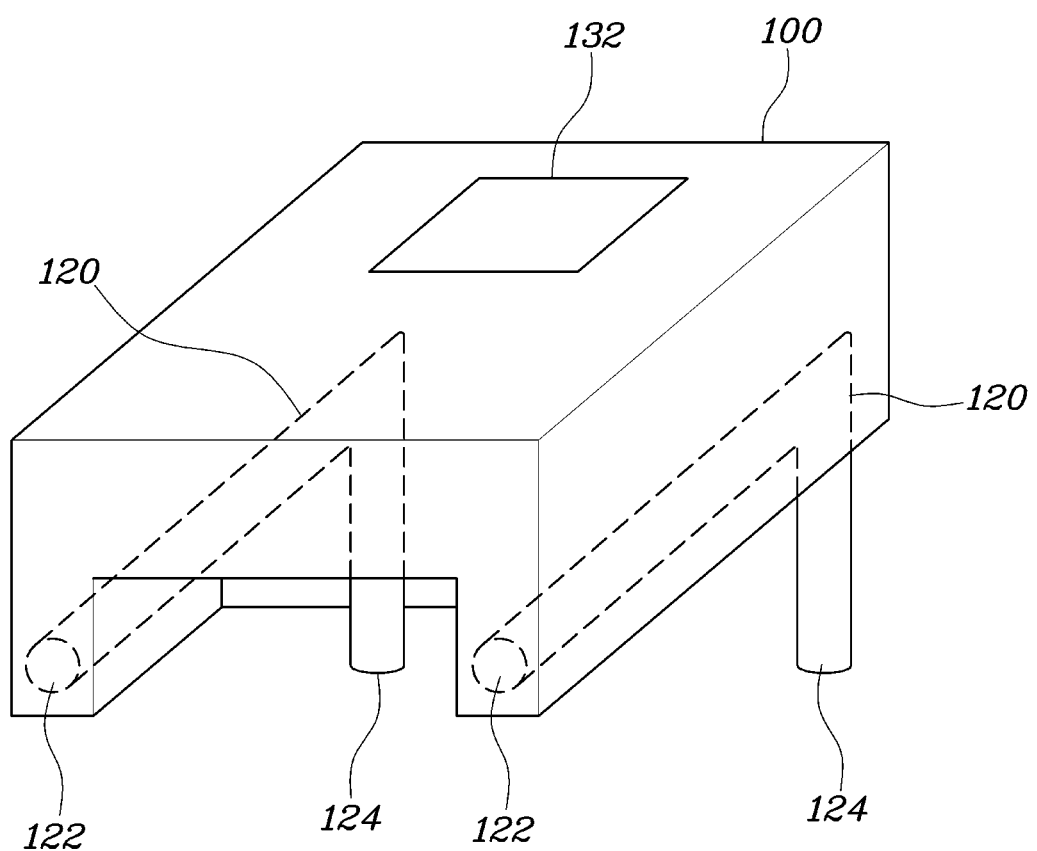
FIG. 4 is an orthographic projection view illustrating a first console unit according to embodiments of the present disclosure.

FIG. 1 is a projection view illustrating a moving console for a vehicle according to embodiments of the present disclosure when viewed from above. FIG. 2 is a projection view illustrating an accommodation box 130 and an air-conditioning duct 120 of a first console unit 100 according to embodiments of the present disclosure. FIG. 3 is an orthographic projection view of a first console unit 100 according to embodiments of the present disclosure. FIG. 4 is an orthographic projection view illustrating a first console unit 100 according to embodiments of the present disclosure.

Referring to FIG. 1 and FIG. 2, an accommodation box 130 may be formed in the first console unit 100 according to embodiments of the present disclosure, an opening/closing unit 132 may be formed at the upper side of the accommodation box 130 to expose the accommodation box 130 when the opening/closing unit 132 is opened, and the air-conditioning duct 120 may be disposed between the outer side of the accommodation box 130 and the outer surface of the first console unit 100.

The air-conditioning duct 120 is disposed between the outer side of the accommodation box 130 and the outer surface of the first console unit 100, and thus the accommodation box 130 and the air-conditioning duct 120 do not interfere with each other. Accordingly, the first console unit 100 has the accommodation box 130 so that cold air or warm air supplied from the air-conditioning system of the vehicle can be discharged to the interior thereof through the air-conditioning duct 120 while maintaining a function as a console.

In addition, in a case of a console having a conventional air-conditioning function, the air-conditioning duct 120 is installed to allow air to flow along a lower surface of the console, but, referring to FIG. 3, in a case of utilizing a structure according to embodiments of the present disclosure, air flowing through the air-conditioning duct 120 can flow along not only a lower surface of the console but also an upper surface thereof.

Figure 6:
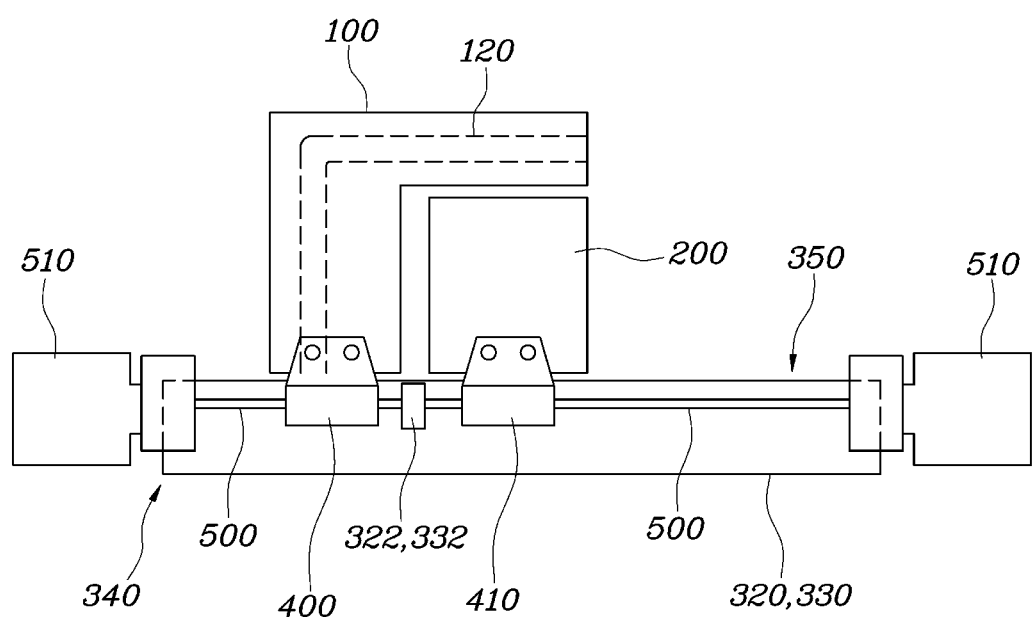
FIG. 6 is a side view of a moving console of a vehicle according to embodiments of the present disclosure.

That is, the air-conditioning duct 120 does not pass through the lower surface of the first console unit 100, and thus a lower space of the first console unit 100 can be additionally used. The moving console according to embodiments of the present disclosure uses the above additional space as the accommodation space no of the second console unit 200, and FIG. 6 illustrates an embodiment showing the state in which the second console unit 200 is accommodated in the first console unit 100.

Meanwhile, referring to FIG. 4, the first console unit 100 according to embodiments of the present disclosure may have an air outlet 122 of the air-conditioning duct 120, formed at the outer sides of opposite side surfaces of the accommodation space for forming the accommodation space no of the second console unit 200. In this case, the accommodation space no for accommodation the second console unit 200 can be secured while, like the conventional console having the air-conditioning function, installing the air-conditioning duct 120 to allow air to flow along the lower surface of the console.

For reference, the opening/closing unit 132 illustrated in FIG. 2 to FIG. 4 is formed at the upper side of the first console unit 100 so that the accommodation box 130 is exposed when the opening/closing unit 132 is opened, and an article is stored in the accommodation box 130 as needed by a user so that a function as a console of the first console unit 100 can be maintained. The opening/closing unit 132 may use a general opening/closing structure such as a cover or a handle for opening/closing as an example, but these examples are merely described for helping the understanding of embodiments of the disclosure and the present disclosure should not be construed to be limited thereto.

Figure 5:
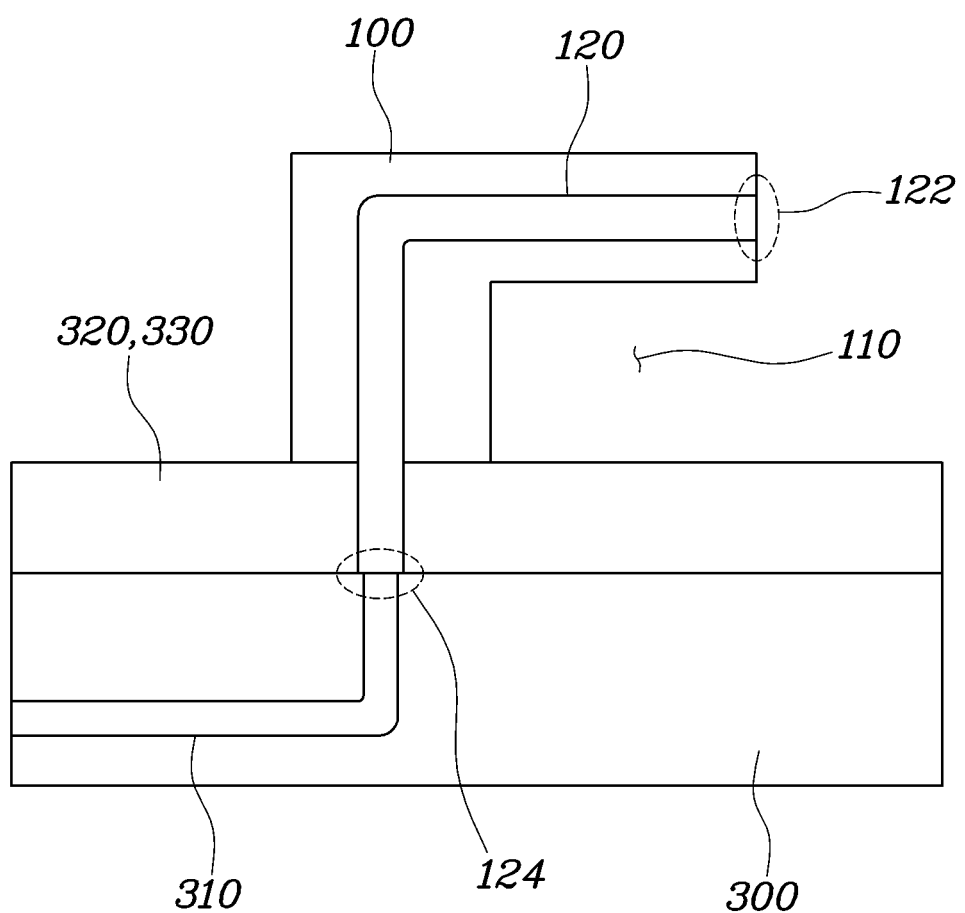
FIG. 5 is a side view illustrating a state in which an air-conditioning duct is connected to a floor duct according to embodiments of the present disclosure.

FIG. 5 is a side view illustrating a state in which an air-conditioning duct 120 is connected to a floor duct 310 according to embodiments of the present disclosure.

Referring to FIG. 5, the air-conditioning duct 120 according to embodiments of the present disclosure may be provided at and fixed to the inner side of the first console unit 100 so that one end thereof communicates with the inner space of the vehicle and the other end is supplied with air from the floor duct 310 fixed to a floor 300 of the vehicle.

Specifically, one end of the air-conditioning duct 120 communicates with the inner space of the vehicle and has an air outlet 122 for discharging cold air or warm air supplied through the floor duct 310 to the interior of the vehicle, and the other end thereof is provided with an air inlet 124 through which air is injected so that the cold air or warm air is supplied from the floor duct 310 and flows to the air-conditioning duct 120, wherein the floor duct 310 may be fixed to the floor 300 of the vehicle and may have an upwardly opened opening to be supplied with cold air or warm air from an air-conditioning device (not illustrated) such as an air conditioner or a heater positioned in the front in the vehicle to supply same toward the air inlet 124 of the air-conditioning duct 120.

That is, the air supplied from the air-conditioning device (not illustrated) is injected to the air inlet 124 of the air-conditioning duct 120 through the floor duct 310, and the injected air flows along the air-conditioning duct 120 and thus is finally discharged to the interior of the vehicle through the air outlet 122. As described above, when subdividing a component of the air-conditioning duct 120, a process of mounting the first console unit 100 according to embodiments of the present disclosure to the vehicle can be easily performed, and, even when a malfunction has occurred due to long-term use and thus a repair is needed, the problem can be solved by replacing only a problematic component.

For reference, a locking device (not illustrated) configured to lock or unlock the air-conditioning duct 120 may be provided at the position in which the air inlet 124 of the air-conditioning duct 120 communicates with the floor duct 310. The air-conditioning duct 120 and the floor duct 310 are locked through the locking device (not illustrated) so that the stable coupling is possible, and the leakage of the cold air or warm air being injected to the air inlet of the air-conditioning duct 120 can be prevented.

In addition, when the first console unit 100 is installed to be movable in the forward or rearward direction of the vehicle, the locking device (not illustrated) configured to lock the air-conditioning duct 120 and the floor duct 310 is unlocked so that the first console unit 100 can move forward or rearward.

Figure 7:
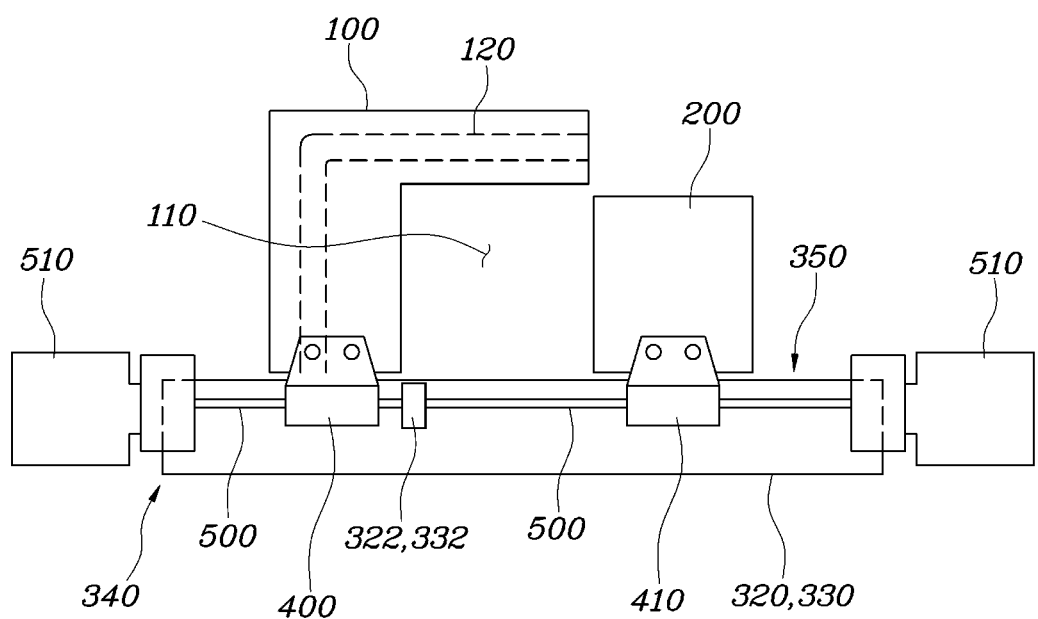
FIG. 7 is a side view illustrating a state in which a second console unit is opened from an accommodation space of a first console unit according to embodiments of the present disclosure.
Figure 8:
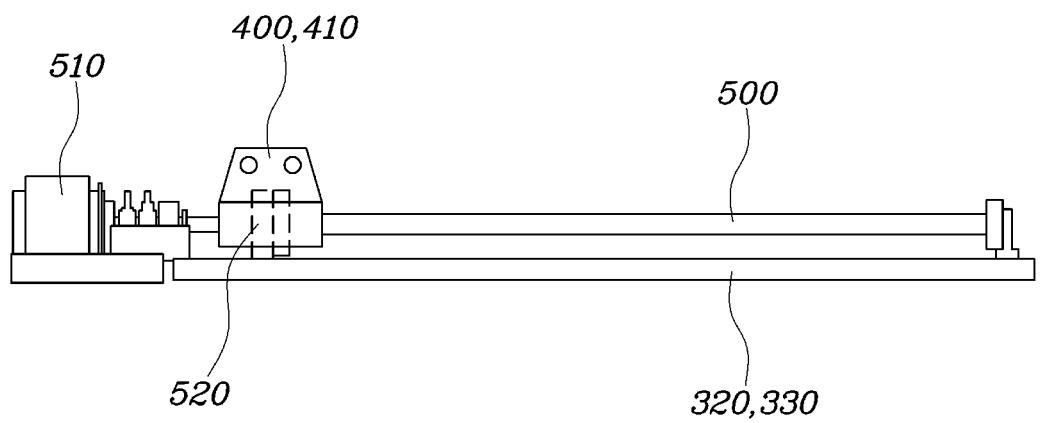
FIG. 8 is a view illustrating a first driving unit or a second driving unit of a moving console of a vehicle according to embodiments of the present disclosure.
Figure 9:
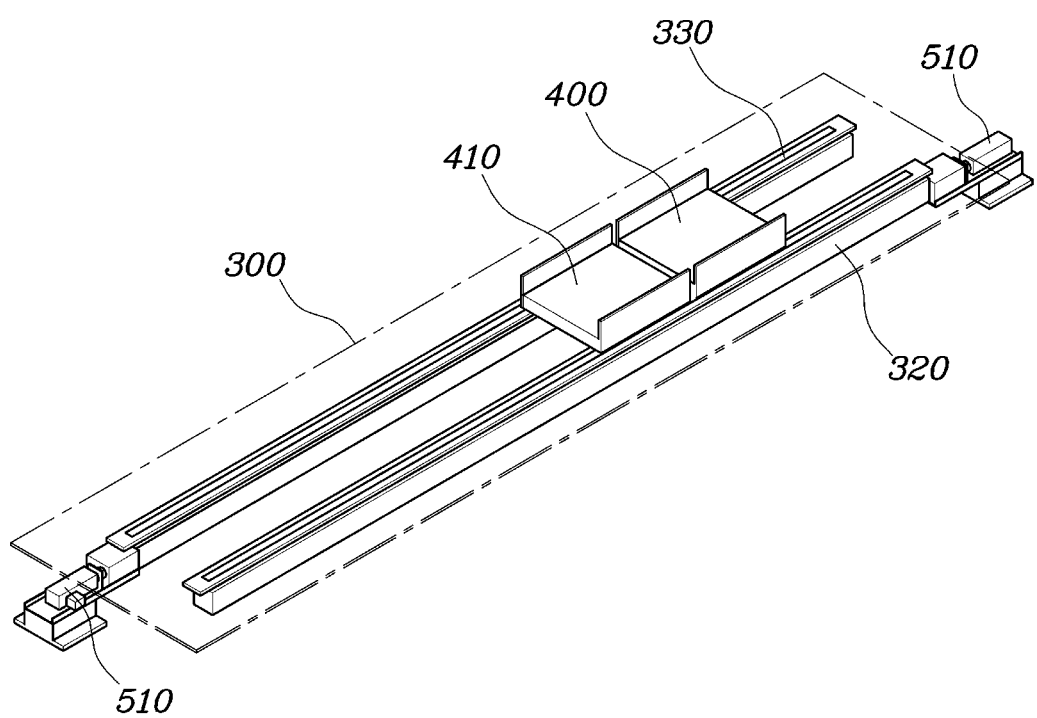
FIG. 9 is a view illustrating, together with a floor of a vehicle, that a moving part of a moving console of a vehicle is positioned at a first rail and a second rail according to embodiments of the present disclosure.

FIG. 1 is a projection view illustrating a moving console for a vehicle according to embodiments of the present disclosure when viewed from above. FIG. 6 is a side view of a moving console of a vehicle according to embodiments of the present disclosure. FIG. 7 is a side view illustrating a state in which a second console unit 200 is opened from an accommodation space no of a first console unit 100 according to embodiments of the present disclosure. FIG. 8 is a view illustrating a first driving unit 340 or a second driving unit 350 of a moving console of a vehicle according to embodiments of the present disclosure. FIG. 9 is a view illustrating, together with a floor 300 of a vehicle, that moving palls 400 and 410 of a moving console of a vehicle are positioned at a first rail 320 and a second rail 330 according to embodiments of the present disclosure.

Referring to FIG. 1, and FIG. 6 to FIG. 9, the moving console of the vehicle according to embodiments of the present disclosure is provided at the floor 300 of the vehicle and further includes a first rail 320 and a second rail 330 which are provided at the floor 300 of the vehicle and extend forward/rearward while being spaced apart from each other, a first moving part 400 which is provided at lower opposite sides of the first console unit 100 and slides on the first rail 320 and the second rail 330, and a second moving part 410 which is provided at lower opposite sides of the second console unit 200 and slides on the first rail 320 and the second rail 330.

In the present technical field, a rail for guiding the movement of the moving part 400 and 410 may be composed of one rail, but, when two rails such as the first rail 320 and the second rail 330 as illustrated herein are used while being spaced apart from each other, the moving parts 400 and 410 are coupled to each of the rails 320 and 330 so that the moving parts 400 and 410 move together with the console unit 100 and 200 while two moving parts support one console unit, and thus the first console unit 100 and the second console unit 200 coupled to the moving parts 400 and 410 to move together therewith can be stably supported. Therefore, even when a plurality of articles are accommodated in the moving console according to embodiments of the present disclosure, the force generated by the load of the accommodated articles can be endured. Here, it may be understood that the force generated by the load of the articles means stress, strain, or the like.

Furthermore, as the first rail 320 and the second rail 330 are arranged to be spaced apart from each other, when each rail extends, the extension part thereof does not collide with or cross each other so that each rail can be formed to further extend in a forward/rearward direction of the vehicle. In a futuristic vehicle that requires various design changes depending on a functional requirement of a user, the configuration of the first console unit 100 and the second console unit 200 may be easily changed to enable the free movement in both opposite directions which are the forward and rearward directions of the vehicle, and this will be described with a stopper 322 and a stopper 332 described later.

For reference, the first rail 320 and the second rail 330 are arranged to be spaced apart from each other in parallel at the left and right sides in the vehicle. That is, as illustrated in FIG. 1, the first rail 320 may be disposed at the left side in the vehicle and the second rail 330 may be disposed at the right side in the vehicle, and, as illustrated in FIG. 9, the first rail 320 may be disposed at the right side in the vehicle and the second rail 330 may be disposed at the left side in the vehicle.

Meanwhile, referring to FIG. 1, and FIG. 6 to FIG. 7, a first stopper 322 is provided at the middle end of the first rail 320 provided at the floor 300 of the vehicle, and a second stopper 332 is provided at the middle end of the second rail 330. Each of the stoppers 322 and 332 restricts the movement direction of each of the first console unit 100 and the second console unit 200 which move in the forward/rearward direction in the vehicle together with the moving parts 400 and 410. Accordingly, the first console unit 100 can move only in the forward direction of the vehicle and the second console unit 200 can move only in the rearward direction of the vehicle.

In addition, in a state where the second console unit 200 is moved out of the first console unit 100 as illustrated in FIG. 7, when the second console unit 200 returns to be accommodated in the accommodation space no of the first console unit 100 as illustrated in FIG. 1 and FIG. 6, each of the moving pails 400 and 410 is restricted by the first stopper 322 and the second stopper 332 so as to prevent a collision which can occur when the second console unit 200 is accommodated in the accommodation space no of the first console unit 100. Therefore, the durability of each of the console units 100 and 200 can be improved and a stable accommodation is possible.

For reference, although FIG. 1 and FIG. 6 to FIG. 7 illustrate the structure in which the first console unit 100 moves only in the forward direction of the vehicle and the second console unit 200 moves only in the rearward direction of the vehicle, this is merely illustrated as an example for helping the understanding of the disclosure and may be variously changed through a simple design change according to types, shapes or functions of an application vehicle such that the first console unit 100 can move in the rearward direction of the vehicle and the second console unit 200 can move in the forward direction of the vehicle.

Furthermore, as described above, in order to allow the first console unit 100 and the second console unit 200 to freely move in both forward and rearward directions of the vehicle, the case of not having the stoppers 322 and 332 may be considered. In this case, the lengths of the first rail 320 and the second rail 330 which were restricted by the stoppers 322 and 332 can extend so that the first rail 320 and the second rail 330 can further extend in the forward/rearward direction of the vehicle, and thus both the first console unit 100 and the second console unit 200 can freely move in the forward/rearward direction of the vehicle. Meanwhile, in the case of not having the stoppers 322 and 332, the collision problem caused by the collision of the first console unit 100 and the second console unit 200 may occur, but this can be solved sufficiently by providing a shock absorption device at a surface on which the accommodation space 110 of the first console unit 100 and the second console unit 200 come into contact with each other.

Meanwhile, the upper sides of the first moving part 400 and the second moving part 410 which slide on the first rail 320 and the second rail 330 are respectively coupled to the lower sides of the first console unit 100 and the second console unit 200 which correspond to each of the moving parts, and thus, when each moving part moves, the first console unit 100 or the second console unit 200 can be moved together therewith. The lower part of each of the moving parts is formed to be received in the upper part of the first rail 320 or the second rail 330 so that the first moving part 400 and the second moving part 410 can slide without departing from the lines on which the first rail 320 and the second rail 330 are provided.

Specifically, referring to FIG. 1 and FIG. 6 to FIG. 7, the moving console of the vehicle according to embodiments of the present disclosure may further include a first driving unit 340 which is provided at the floor 300 of the vehicle and provides a moving force in the forward/rearward direction for the first moving part 400, and a second driving unit 350 which is provided at the floor 300 of the vehicle is disposed in the direction opposite to the first driving unit 340 and provides a moving force in the forward/rearward direction for the second moving part 410.

That is, when the first driving unit 340 or the second driving unit 350 is driven by a separate control switch, or the like, the first moving pall 400 or the second moving part 410 slides along the first rail 320 and the second rail 330 so that the first console unit 100 or the second console unit 200 moves together therewith, and thus the position of each console can vary with respect to a vehicle body.

In addition, the first driving unit 340 and the second driving unit 350 may be arranged in the directions opposite to each other with respect to the longitudinal direction of the vehicle body, and thus the load of each driving unit can be evenly distributed in the forward/rearward direction of the vehicle. Accordingly, a load concentration phenomenon which can occur when all driving units are arranged on one side among the front or the back of the vehicle body can be prevented.

FIG. 8 is a view illustrating a first driving unit 340 or a second driving unit 350 of a moving console of a vehicle according to embodiments of the present disclosure.

Referring to FIG. 8, the first driving unit 340 and the second driving unit 350 of the vehicle according to embodiments of the present disclosure may include a shaft 500 and a motor 510 configured to rotate the shaft 500, wherein a nut 520 screw-coupled to the shaft 500 to slide on the shaft 500 is provided at each of the first moving part 400 and the second moving part 410.

That is, each of the motors 510 provided at the first driving unit 340 and the second driving unit 350 rotates a screw thread formed at the shaft 500, and the nut 520 screw-coupled to the shaft 500 linearly moves. Therefore, the moving palls 400 and 410 can slide along the direction in which the nut 520 linearly moves, and thus the first console unit 100 slides together with the first moving part 400 and the second console unit 200 slides together with the second moving part 410.

In addition, the shaft 500 of the first driving unit 340 of the moving console of the vehicle according to embodiments of the present disclosure may extend along the first rail 320, and the shaft 500 of the second driving unit 350 may extend along the second rail 330 at the side opposite to the shaft 500 of the first driving unit 340.

Specifically, the shaft 500 provided at each driving unit extends along the longitudinal direction of the first rail 320 and the second rail 330 to extend through from one side of the moving parts 400 and 410 to the other side thereof. That is, each of the extended shafts 500 is integrated with the moving parts 400 and 410 while being surrounded thereby, so that when each of the moving parts 400 and 410 moves together with the first console unit 100 or the second console unit 200, the moving path can be guided in a soft and stable manner.

Furthermore, the motor 510 of the first driving unit 340 of the moving console of the vehicle according to embodiments of the present disclosure may be provided at the front end of the shaft 500 of the first driving unit 340 and the motor 510 of the second driving unit 350 may be provided at the rear end of the shaft 500 of the second driving unit 350.

Here, although it may be understood that the front end of the shaft 500 means the front side of the vehicle and the rear end of the shaft 500 means the rear side of the vehicle, the configuration may be changed through a simple design change to be understood that the front end of the shaft 500 means the rear side of the vehicle and the rear end of the shaft 500 means the front side of the vehicle. Hereinafter, it will be described that the front end of the shaft 500 means the front side of the vehicle and the rear end of the shaft 500 means the rear side of the vehicle to help the understanding of the disclosure, but it should not be construed that the present disclosure is limited to the description above.

When the front end and the rear end of the shaft 500 are understood as described above, the motor 510 of the first driving unit 340 is installed at the front side of the vehicle and the motor 510 of the second driving unit 350 is installed at the rear side of the vehicle. Accordingly, the motor 510 of each driving unit may be arranged in the directions opposite to each other with respect to the longitudinal direction of the vehicle body, and thus the load of each driving unit can be evenly distributed in the forward/rearward direction of the vehicle. That is, a load concentration phenomenon which can occur when all of the motors 510 of each driving unit are at one side among the front or the back of the vehicle body can be prevented.

FIG. 9 is a view illustrating, together with the floor 300 of a vehicle, that a moving part of a vehicle is positioned at the first rail 320 and the second rail 330 according to embodiments of the present disclosure.

Referring to FIG. 9, the first driving unit 340 and the second driving unit 350 of the moving console of the vehicle according to embodiments of the present disclosure may be provided at the lower part of the floor 300 of the vehicle not to be exposed to the interior of the vehicle.

That is, each driving unit is provided at the lower part of the floor 300 of the vehicle and thus does not additionally occupy the inner space of the vehicle, and accordingly, wider inner space is provided to a passenger so that a free boarding environment can be provided.

In addition, in a process of assembling vehicle components, the floor 300 of the vehicle is coupled after installing the first driving unit 340 and the second driving unit 350 so that the process can be easily performed. That is, as the assembly process is simplified, manufacturing costs can be reduced.

Figure 10:
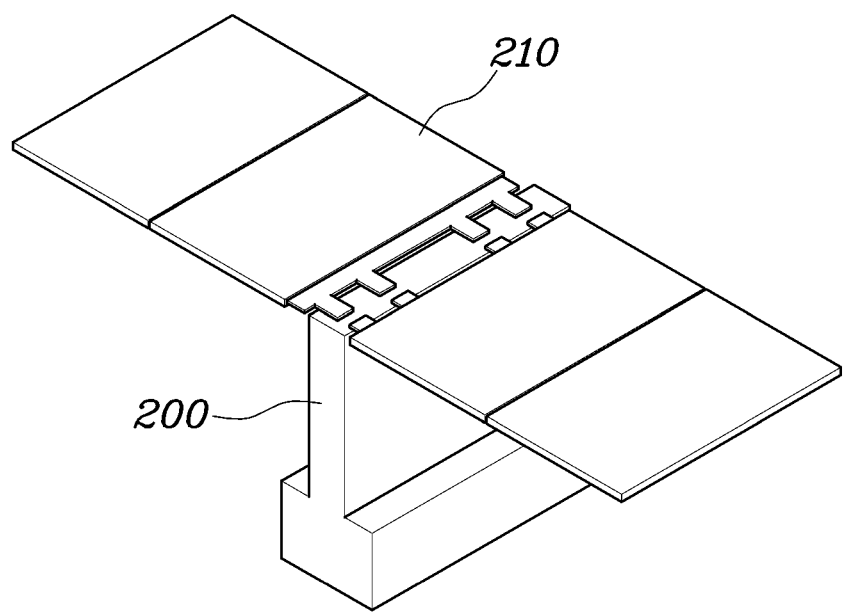
FIG. 10 is a view illustrating a table provided at a second console unit according to embodiments of the present disclosure.

FIG. 10 is a view illustrating a table 210 provided at a second console unit according to embodiments of the present disclosure.

Referring to FIG. 10, the table 210 is accommodated in the second console unit 200, and, when the second console unit 200 slides rearward and the upper surface of the second console unit 200 is opened, the table 210 accommodated therein may deploy to the outside through the opened upper surface of the second console unit 200.

The table 210 accommodated in the second console unit 200 may be provided in a form of foldable device as illustrated in FIG. 10. The foldable device may be provided at the corners of opposite side surfaces of the second console unit 200 by means of hinge-coupling or the like. That is, the device may be stored while being folded in a state in which the device is in contact with the opposite side surfaces of the second console unit 200 when not in use, and may be unfolded while forming a right angle with the height direction of the second console unit 200 when in use as the table 210 as illustrated in FIG. 10.

In this case, a fixing device (not illustrated) configured to fix the foldable device while forming the right angle with the height direction of the second console unit, a fixing unit (not illustrated) configured to fix the device while the device is in contact with the opposite side surfaces of the second console unit when not in use, and the like may be further provided. These fixing devices (not illustrated) and the fixing unit (not illustrated) may be implemented by various conventional fixing means such as a fixing hole and a fixing groove.

Meanwhile, FIG. 10 merely shows an example of a structure in which the table 210 accommodated in the second console unit 200 is formed as a foldable device to help the understanding of the disclosure, and it is not necessary to be configured as the foldable device as illustrated above and may be variously changed according to the design.

In addition, although not illustrated in FIG. 10, when further securing a center space, among the upper surface of the second console unit 200, excluding opposite side surface corners which are hinge-coupled to the foldable device, the second console unit 200 may also have an accommodation box configured to accommodate articles therein like the first console unit 100 according to the size of the second console unit 200.

As a result, the table function can be provided to all the passengers in the front seats and the rear seats by providing the table 210 as described above.

For reference, the device configured to provide an additional convenience function while being accommodated in the second console unit 200 may be replaced with various convenience devices such as a display device in addition to the table.

Meanwhile, the table 210 provided at the second console unit 200 may be blocked by the first console unit 100 and thus may not deploy when the second console unit 200 is inserted into the accommodation space no of the first console unit 100.

Referring to FIG. 4 and FIG. 10, when the table device deploys to form the right angle with the height direction of the second console unit 200 in a state in which the second console unit 200 is inserted into the accommodation space no of the first console unit 100, the air outlet 122 of the air-conditioning duct 120 is blocked by means of the structure of the opposite side surfaces of the accommodation space no, which is configured to form the accommodation space no of the first console unit 100.

That is, after use of the table function is finished, the table device is folded to be in contact with the opposite side surfaces of the second console unit 200 and the second console unit 200 is stored by being accommodated in the accommodation space no of the first console unit, and thus a wide inner space can be provided to the passenger so that a free boarding environment can be made.

Figure 11:
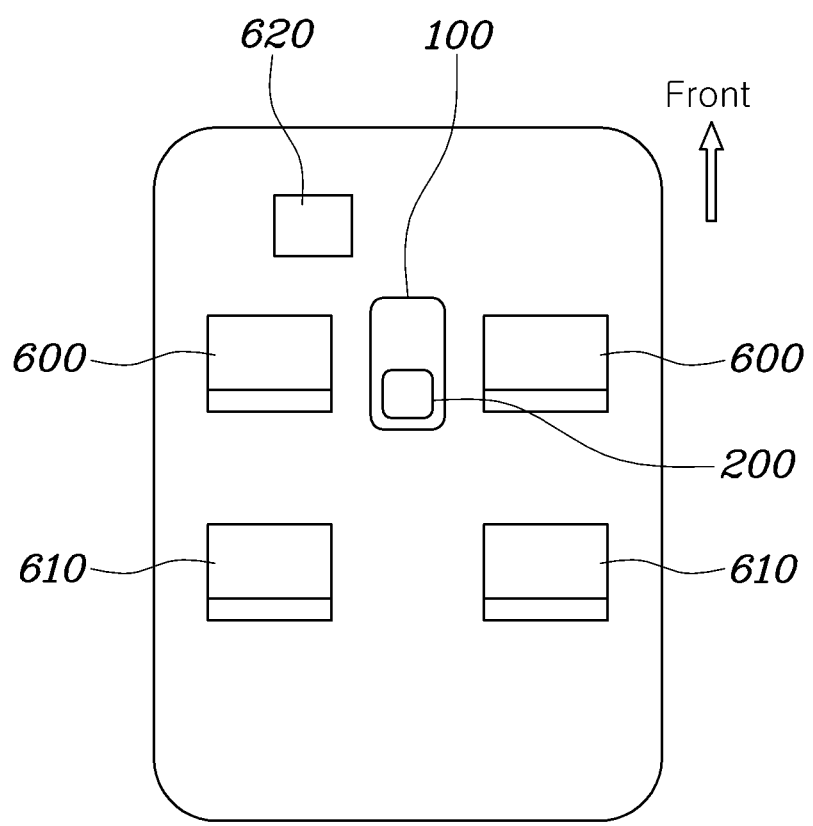
FIG. 11 is a view illustrating a state in which a moving console of a vehicle is provided in a space between a left seat and a right seat of front seats of the vehicle according to embodiments of the present disclosure.
Figure 12:
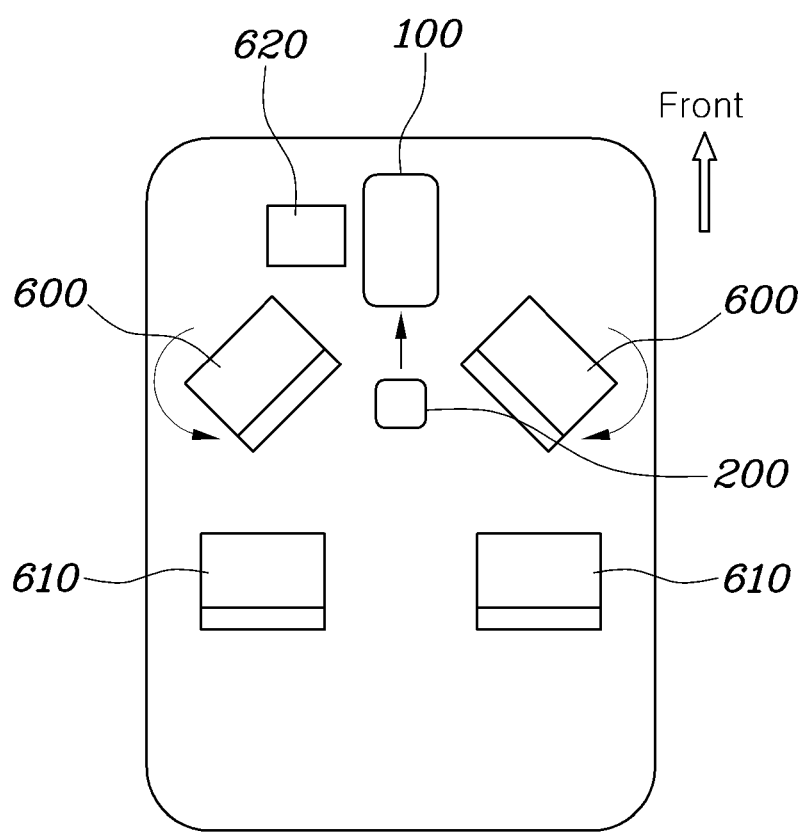
FIG. 12 is a view illustrating a state a first console unit slides in a forward direction of a vehicle according to embodiments of the present disclosure.
Figure 13:
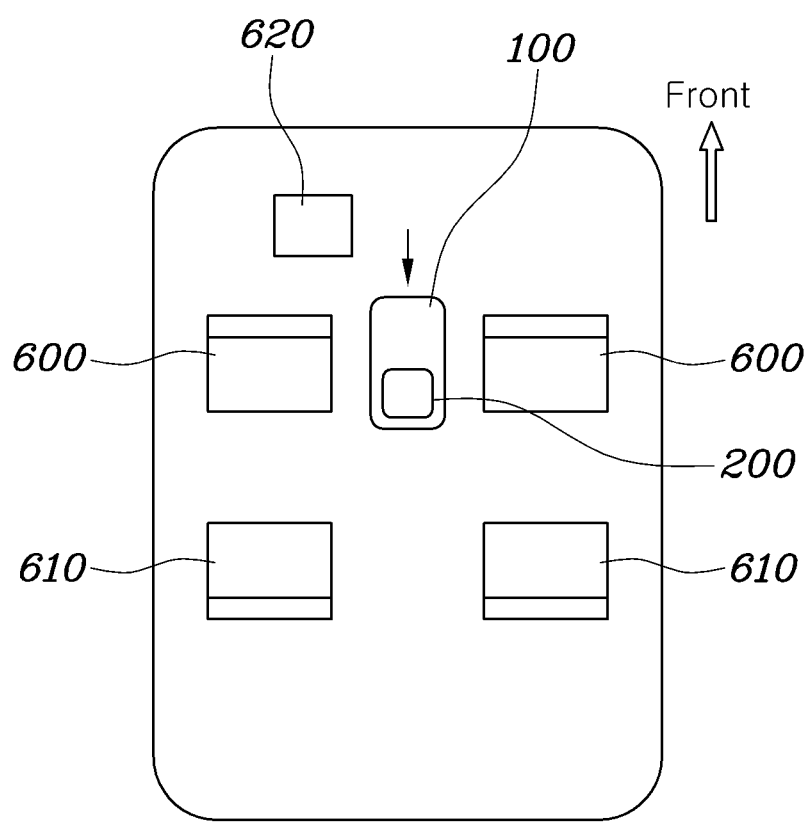
FIG. 13 is a view illustrating a state in which a first console unit returns to the original state in a rearward direction of a vehicle according to embodiments of the present disclosure.

FIG. 11 is a view illustrating a state in which a moving console of a vehicle is provided in a space between a left seat and a right seat of front seats 600 of the vehicle according to embodiments of the present disclosure. FIG. 12 is a view illustrating a state in which a first console unit 100 slides in a forward direction of a vehicle according to embodiments of the present disclosure. FIG. 13 is a view illustrating a state in which a first console unit 100 returns to the original state in a rearward direction of a vehicle according to embodiments of the present disclosure.

Referring to FIG. 11, the first console unit 100 and the second console unit 200 may be provided in the space between the left seat and the right seat of the front seats 600 of the vehicle, and may further include a control unit 620 configured to slide the first console unit 100 in the forward direction of the vehicle when the left seat or the right seat of the front seats 600 is swiveled and return the first console unit 100 to the original state in the rearward direction of the vehicle when the left seat or the right seat 600 has swiveled.

The control unit 620 according to an exemplary embodiment of the present disclosure may be implemented via an algorithm configured to control the operation of various components of the vehicle, a nonvolatile memory (not illustrated) configured to store data related to a software instruction for playing the algorithm, or a processor (not illustrated) configured to perform an operation described below by using the data stored in the corresponding memory. Here, the memory and the processor may be implemented by separate chips. Alternatively, the memory and the processor may be implemented by a single chip integrated with each other, and the processor may have the form of one or more processors.

That is, since the front seats 600 and the rear seats 610 are arranged in the back-and-forth order toward the front of the vehicle body and the first console unit 100 and the second console unit 200 are arranged between the left seat and the right seat of the front seats 600, the arrangement state of seats and a console is almost identical to that of a conventional general passenger vehicle.

The seat state described above may be understood to correspond to the state in which air can be supplied to the interior of the vehicle from the air-conditioning system through the air-conditioning duct 120 provided in the first console unit 100.

The control unit 620 capable of controlling the movement of the moving console according to embodiments of the present disclosure may be separately provided in the vehicle as illustrated above, wherein the control unit 620 may be configured to implement a function of controlling the movement of the first console unit 100 or the second console unit 200 by utilizing a separate operation switch or the like by means of various human machine interface (HMI) means such as a gesture command, a voice command, and an input switch operation of a user.

Meanwhile, in recent vehicles, the seat is not fixedly installed with respect to the vehicle body and thus can not only move back and forth and right and left but also can perform swiveling. That is, the seat state of the vehicle can be switched from a basic seat state in which the front seats 600 and the rear seats 610 are arranged such that all the passengers look forward to a face-to-face seat state in which the front seats 600 are swiveled such that the passengers in the front seats 600 look rearward and thus the passengers in the front seats 600 and the passengers in the rear seats 610 face each other.

The function of changing from the basic seat state to the face-to-face seat state as described above can be started by the user's separate switch operation input. Therefore, when there is a switch operation or the like by the user, the control unit 620 can additionally determine that the change to the face-to-face seat state is started.

When changing from the basic seat state to the face-to-face seat state, swiveling of the front seats 600 is accompanied. Accordingly, the first console unit 100 needs to secure a sufficient space not to interfere with swiveling of the front seats 600 when the front seats 600 are swiveled.

That is, referring to FIG. 12, when the function of changing from the basic seat state to the face-to-face seat state is started, the first console unit 100 is moved in the forward direction of the vehicle so that a space is formed between the left seat and the right seat of the front seats 600, and thus the front seats 600 can be smoothly swiveled.

Referring to FIG. 13, when swiveling of the front seats 600 is completed and the change to the face-to-face seat state is finished, the first console unit 100 returns to the original state before being moved forward. Accordingly, the cold air or warm air supplied through the air-conditioning duct 120 of the first console unit 100 is discharged to the space in which the passengers of the front seats 600 and the rear seats 610 face each other, and thus the interior air-conditioning of the vehicle can be smoothly performed.

Therefore, the smooth swiveling of the front seats 600 is secured through the forward sliding of the first console unit 100 so that various seat variation functions required for a futuristic vehicle can be achieved, and the rearward sliding of the first console unit 100 positions the air inlet 124 of the air-conditioning duct 120 to communicate with the opening of the floor duct 310 so that the smooth air-conditioning performance in the vehicle can be secured.

Figure 14:
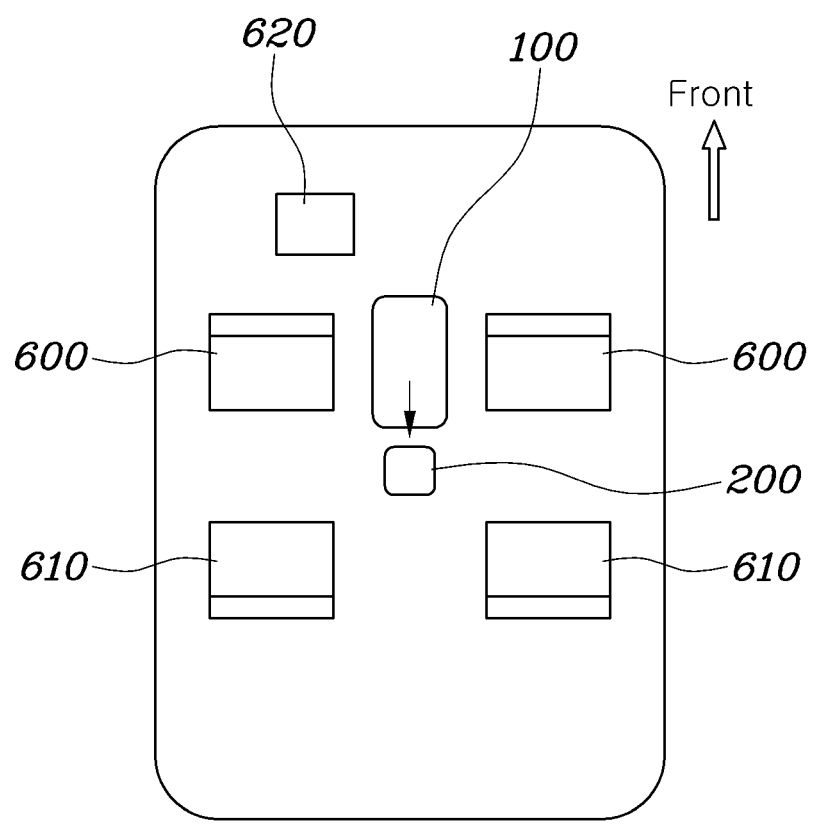
FIG. 14 is a view illustrating a state in which a second console unit slides backward according to embodiments of the present disclosure.

FIG. 14 is a view illustrating a state in which a second console unit 200 slides rearward according to embodiments of the present disclosure.

As described above, in recent vehicles, a seat is not fixedly installed with respect to a vehicle body and can not only move back and forth and right and left but can also perform swiveling. That is, the seat state of the vehicle can be switched from the basic seat state in which the front seats 600 and the rear seats 610 are arranged such that all the passengers look in front of the vehicle to the face-to-face seat state in which the front seats 600 are swiveled such that the passengers in the front seats 600 look rearward and thus the passengers in the front seats 600 and the passengers in the rear seats 610 face each other.

When changing from the basic seat state to the face-to-face seat state, swiveling of the front seats 600 is accompanied, and thus not only the first console unit 100 but also the second console unit 200 need to secure a sufficient space not to interfere with swiveling of the front seats 600 when the front seats 600 are swiveled.

That is, when the function of changing from the basic seat state to the face-to-face seat state is started, the second console unit 200 is opened from the accommodation space no of the first console unit 100 and moved in the rearward direction of the vehicle so that a space is formed between the left seat and the right seat of the front seats 600, and thus the front seats 600 can be smoothly swiveled.

As described above with respect to FIG. 1 and FIG. 6 to FIG. 7, if the stoppers 322 and 332 are not provided to allow the first console unit 100 and the second console unit 200 to be movable in both forward and rearward directions, the second console unit 200 can move not only rearward but also forward, and thus each console unit can move forward together therewith in a state in which the second console unit 200 is accommodated in the accommodation space no of the first console unit 100 so that the smooth swiveling of the front seats 600 can be possible.

Referring to FIG. 14, when the left seat or the right seat of the front seats 600 is swiveled to face the rear seats 610, the control unit 620 of the moving console of the vehicle according to embodiments of the present disclosure may slide the second console unit 200 rearward so that the second console unit 200 is adjacent to the rear seats 610.

That is, when it is changed from the basic seat state to the face-to-face seat state, the second console unit 200 is slid rearward to be adjacent to the rear seats 610 and the table 210 accommodated in the second console unit 200 deploys outward, and thus an additional convenience function can be provided to all of the passengers in the front seats 600 and the passengers in the rear seats 610 in the face-to-face seat state.

In this case, the second console unit 200 can be slid to a desired position as needed by a user, and FIG. 14 merely illustrates, as an example, the state in which the second console unit 200 has moved to the center portion of the vehicle body, but the present disclosure should not be construed to be limited by the example.

The present disclosure has been illustrated and described in relation to specific embodiments. However, it will be obvious to those skilled in the art that the present disclosure can be variously modified and changed without departing from the technical sprit of the present disclosure provided in the following claims.

What is claimed is:

1. A moving console for a vehicle, the moving console comprising:
   a first console unit including an accommodation space configured to be opened forward or rearward and an air-conditioning duct disposed at an outer side of the accommodation space and configured to discharge air to an interior of the vehicle through the air-conditioning duct; and
   a second console unit installed to be slidable at a front or a back of the first console unit such that, depending on forward/rearward sliding, the second console unit is accommodated in the accommodation space of the first console unit or is deployed out of the first console unit.

2. The moving console of claim 1, further comprising:
   an accommodation box in the first console unit, wherein the air-conditioning duct is disposed between an outer side of the accommodation box and an outer surface of the first console unit; and
   an opening/closing unit at an upper side of the accommodation box and configured to expose the accommodation box when the opening/closing unit is opened.

3. The moving console of claim 1, wherein the air-conditioning duct is provided at and fixed to an inner side of the first console unit and has a first end communicating with an inner space of the vehicle and a second end configured to be supplied with air from a floor duct fixed to a floor of the vehicle.

4. The moving console of claim 1, further comprising a table provided at the second console unit, wherein, when the second console unit slides rearward and an upper surface of the second console unit is opened, the table is configured to deploy outside of the second console unit through the opened upper surface of the second console unit.

5. The moving console of claim 4, wherein, when the second console unit is inserted into the accommodation space of the first console unit, the table provided at the second console unit is blocked by the first console unit and does not deploy.

6. The moving console of claim 1, wherein:
the first console unit and the second console unit are provided in a space between a left front seat and a right front seat of the vehicle; and
the moving console further comprises a control unit configured to control the first console unit to slide in a forward direction of the vehicle when the left front seat or the right front seat is swiveled and to control the first console unit to return to an original state in a rearward direction of the vehicle when the left front seat or the right front seat has completed swiveling.

7. The moving console of claim 6, wherein, when the left front seat or the front right seat is swiveled to face rear seats of the vehicle, the control unit is configured to control the second console unit to slide rearward to be adjacent to the rear seats.

8. A moving console for a vehicle, the moving console comprising:
a first console unit including an accommodation space configured to be opened forward or rearward and an air-conditioning duct disposed at an outer side of the accommodation space and configured to discharge air to an interior of the vehicle through the air-conditioning duct;
a second console unit installed to be slidable at a front or a back of the first console unit such that, depending on forward/rearward sliding, the second console unit is accommodated in the accommodation space of the first console unit or is deployed out of the first console unit;
a first rail and a second rail provided at a floor of the vehicle and extending forward/rearward while being spaced apart from each other;
a first moving part provided at lower opposite sides of the first console unit and configured to slide on the first rail and the second rail; and
a second moving part provided at lower opposite sides of the second console unit and configured to slide on the first rail and the second rail.

9. The moving console of claim 8, further comprising:
a first driving unit provided at the floor of the vehicle and configured to provide a moving force in a forward/rearward direction for the first moving part; and
a second driving unit provided at the floor of the vehicle, disposed in a direction opposite to the first driving unit, and configured to provide a moving force in a forward/rearward direction for the second moving part.

10. The moving console of claim 9, wherein:
the first driving unit and the second driving unit each comprise a shaft having a screw thread formed therein and a motor configured to rotate the shaft; and
a nut screw-coupled to the shaft and configured to slide on the shaft is provided at each of the first moving part and the second moving part.

11. The moving console of claim 10, wherein the shaft of the first driving unit extends along the first rail and the shaft of the second driving unit extends along the second rail at a side opposite to the shaft of the first driving unit.

12. The moving console of claim 10, wherein the motor of the first driving unit is provided at a front end of the shaft of the first driving unit and the motor of the second driving unit is provided at a rear end of the shaft of the second driving unit.

13. The moving console of claim 9, wherein the first driving unit and the second driving unit are provided at a lower part of the floor of the vehicle and are not exposed to an indoor space of the vehicle.

14. A vehicle comprising:
a vehicle floor;
left and right front seats disposed on the vehicle floor in a front region of an interior of the vehicle;
left and right rear seats disposed on the vehicle floor in a rear region of the interior of the vehicle;
a first console unit comprising:
an accommodation space configured to be opened forward or rearward; and
an air-conditioning duct disposed at an outer side of the accommodation space and configured to discharge air to the interior of the vehicle; and
a second console unit installed to be slidable at a front or a back of the first console unit such that, depending on forward/rearward sliding, the second console unit is accommodated in the accommodation space of the first console unit or is deployed out of the first console unit.

15. The vehicle of claim 14, further comprising:
an accommodation box in the first console unit, wherein the air-conditioning duct is disposed between an outer side of the accommodation box and an outer surface of the first console unit; and
an opening/closing unit at an upper side of the accommodation box and configured to expose the accommodation box when the opening/closing unit is opened.

16. The vehicle of claim 14, wherein the air-conditioning duct is provided at and fixed to an inner side of the first console unit and has a first end communicating with the interior of the vehicle and a second end configured to be supplied with air from a floor duct fixed to the vehicle floor.

17. The vehicle of claim 14, further comprising a table provided at the second console unit, wherein, when the second console unit slides rearward and an upper surface of the second console unit is opened, the table is configured to deploy outside of the second console unit through the opened upper surface of the second console unit.

18. The vehicle of claim 14, further comprising a table provided at the second console unit, wherein, when the second console unit is inserted into the accommodation space of the first console unit, the table provided at the second console unit is blocked by the first console unit and does not deploy.

19. The vehicle of claim 14, wherein the first console unit and the second console unit are provided in a space between the left and right front seats of the vehicle, and wherein the vehicle further comprises a control unit configured to control the first console unit to slide in a forward direction of the vehicle when the left front seat or the right front seat is swiveled and to control the first console unit to return to an original state in a rearward direction of the vehicle when the left front seat or the right front seat has completed swiveling.

20. The vehicle of claim 19, wherein, when the left front seat or the right front seat is swiveled to face the left and right rear seats of the vehicle, the control unit is configured to control the second console unit to slide rearward to be adjacent to the left and right rear seats.

* * * * *